United States Patent Office 2,751,396
Patented June 19, 1956

2,751,396

SUBSTITUTED BENZ [CD] INDOLINES

Edmund C. Kornfeld, Indianapolis, Ind., assignor to Eli Lilly and Company, Indianapolis, Ind., a corporation of Indiana No Drawing. Application July 16, 1952,
Serial No. 299,225

9 Claims. (Cl. 260—319)

This invention relates to novel organic compounds and more particularly to substituted benz[cd]indolines and their preparation.

The substituted benz[cd]indolines of this invention are represented by the following formula

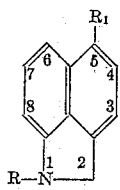

in which R represents an aliphatic carboxylic acyl, or a monocyclic carboxylic aroyl radical and $R_1$ represents a formyl, cyano, acyl, carboxyalkyl, carbalkoxyalkyl, or formylsemicarbazone radical.

Broadly speaking, the new indolines are prepared by dehydrogenation of the corresponding 1,2,2a,3-tetrahydrobenz[cd]indoles, which intermediates are described in my co-pending application Serial No. 248,103, filed October 24, 1951.

The following series of equations, in which R represents an aliphatic carboxylic acyl or a monocyclic carboxylic aroyl radical, illustrates the preparation of representative compounds of the invention.

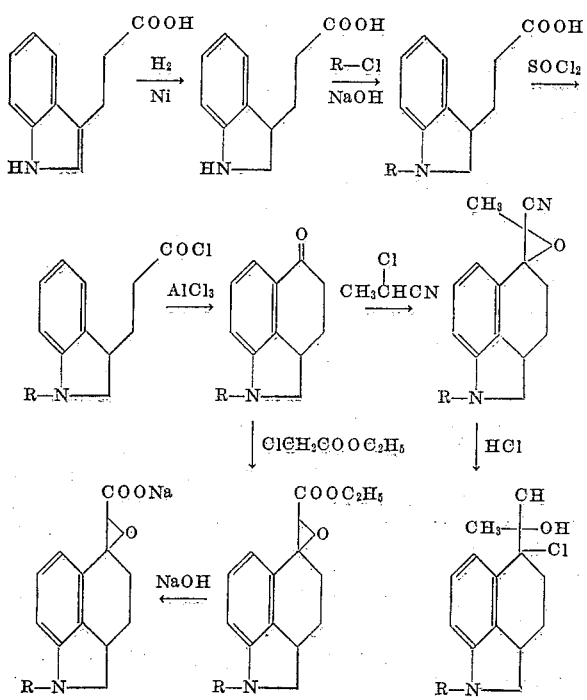

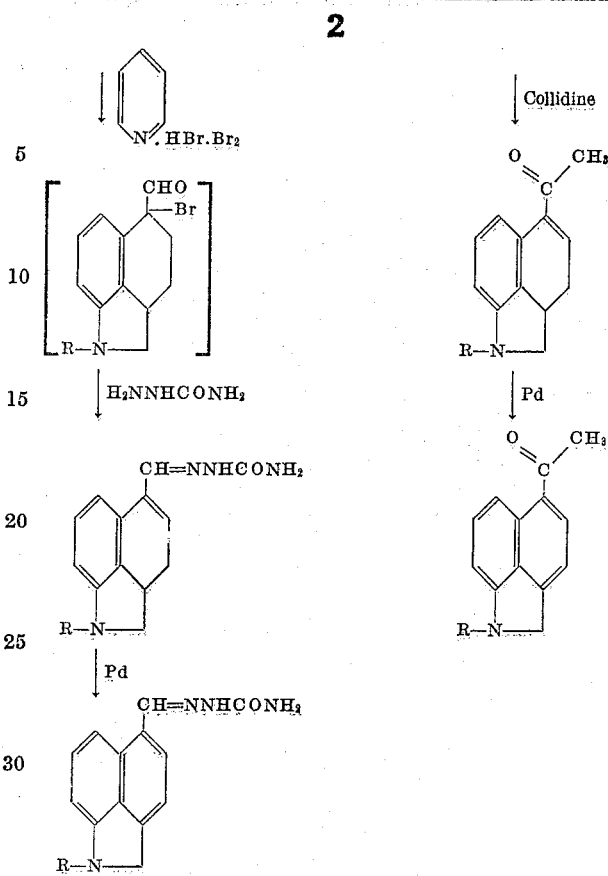

Referring to the foregoing series of reactions, indole-3-propionic acid is hydrogenated and reacted with an acyl halide to form the corresponding acylated hydrogenated compound, which is treated with thionyl chloride and cyclized with aluminum chloride to produce an N-acyl-5-keto-1,2,2a,3,4,5-hexahydrobenz[cd]indole.

The N-acyl-5-keto-1,2,2a,3,4,5-hexahydrobenz[cd]indole is reacted with a chloroacetic acid ester in a Darzen's type reaction to produce a glycidic ester which is hydrolyzed to the sodium salt of the glycidic acid. The reaction of the sodium salt with pyridine hydrobromide perbromide and treatment of the intermediate bromoaldehyde (not isolated) with semicarbazide yields a semicarbazone of an N-acyl-5-formyl-1,2,2a,3-tetrahydrobenz[cd]indole. Removal of the semicarbazide group yields an N-acyl-5-formyl-1,2,2a-3-tetrahydrobenz[cd]indole, from which the N-acyl group can be removed by hydrolysis. By dehydrogenation of the indole with palladium, the N-acyl-5-formylbenz[cd]indoline semicarbazone of the present invention is formed.

From N-acyl-5-keto1,2,2a,3,4,5-hexahydrobenz[cd]indole 5-acyl substituted compounds are prepared as follows:

The N-acyl-5-keto-1,2,2a,3,4,5-hexahydrobenz[cd]indole is reacted with an α-haloalkyl cyanide in a Darzen's reaction to produce a glycidonitrile compound which upon reaction with hydrogen chloride followed by treatment with collidine yields an N-acyl-5-acetyl-1,2,2a,3-tetrahydrobenz[cd]indole. Dehydrogenation of this compound with palladium produces an N-acyl-5-acetylbenz[cd]indoline of the present invention.

It is to be understood that the above series of reactions is illustrative only; obvious modifications will be apparent to those skilled in the art. Thus for example, although certain of the reactions as illustrated employ a particular acyl halide or a particular carboxylic acid ester, other equivalent halides and esters can be employed.

The compounds of this invention are useful intermediates in the synthesis of compounds having the ring system of ergot alkaloids, such as lysergic acid. Thus, for example, N-benzoyl-5-formylbenz[cd]indoline can be converted to lysergic acid by a series of reactions involving an initial condensation with acetylene, followed by acetylation to give the acetylenic carbinol acetate. This compound on reaction with nickel carbonyl yields the corresponding acrylic acid, which adds methylamine to form the β-methylamino derivative. The latter compound on hydrolysis yields a mixture of dl-lysergic acids which can be separated and resolved by methods known to the art. Similarly, N - benzoyl-5-carboxymethylbenz[cd]indoline can be converted to lysergic acid by a sequence of reaction steps which involve conversion of the carboxymethyl compound to the corresponding acid chloride with thionyl chloride, followed by reaction of the acid chloride with diazomethane to yield the diazo ketone. The diazo ketone on reaction with hydrogen bromide is converted to the corresponding α-bromo ketone, which is transformed by reaction with potassium phthalimide to the phthalimido ketone. The phthalimido ketone is converted to its cyanohydrin by means of hydrogen cyanide, and this is dehydrated to the unsaturated nitrile. The nitrile on hydrolysis affords dl-norlysergic acid, which on methylation yields lysergic acid. The series of reactions set forth above can be carried out using other N-acyl derivatives, such as N-acetyl-5-formylbenz[cd]indoline. The N-acyl-5-carbalkoxyalkylbenz[cd]indolines can be converted to the corresponding carboxyalkyl compounds by hydrolysis and subjected to the procedures already described, to yield lysergic acid. Modifications of these methods will be obvious to those skilled in the art.

The following examples illustrate the preparation of the new compounds.

*Example 1*

A mixture of 118 g. (0.4 mol) of N-benzoylindoline-3-propionic acid, prepared according to the method of Robinson [J. Chem. Soc. 1931, 3158] and 200 ml. of thionyl chloride was allowed to stand at room temperature for ½ hour and was warmed on a steam bath for about twenty minutes. The excess thionyl chloride was evaporated in vacuo, and the residue comprising N-benzoylindoline-3-propionyl chloride was dissolved in 200 ml. of dry carbon disulfide. The solution was added in a thin stream to a vigorously stirred suspension of 240 g. of aluminum chloride in 1750 ml. of carbon disulfide. The mixture was refluxed and stirred for one hour and treated with a mixture of 500 g. of ice, 250 ml. of concentrated hydrochloric acid, and 500 ml. of water. The mixture was stirred during the addition of the ice mixture and was cooled by intermittently distilling a portion of the carbon disulfide in vacuo. After addition of all of the ice mixture, the carbon disulfide remaining was distilled in vacuo and the aqueous residue was extracted with 2 l. of benzene. The benzene extract was dried over magnesium sulfate and evaporated in vacuo to a small volume. Several volumes of petroleum ether were added slowly to the concentrate whereupon a yellow crystalline precipitate of N-benzoyl-5-keto-1,2,2a,3,4,5-hexahydrobenz[cd]indole separated. The precipitate was filtered off, washed with petroleum ether, and recrystallized from benzene-petroleum ether mixture. After recrystallization from benzene-petroleum ether mixture, it melted at about 146–147° C.

*Analysis.*—Calculated for $C_{15}H_{15}NO_2$: C, 77.96; H, 5.45; N, 5.05. Found: C, 78.15; H, 5.31; N, 5.15.

32.4 g. (0.83 gram atom) of potassium were dissolved in a mixture of 800 ml. of dry tertiary butanol and 700 ml. of dry benzene maintained under nitrogen. The solvents were removed in vacuo, and the potassium t-butoxide was suspended in 1500 ml. of a mixture of equal volumes of dry benzene and dry toluene. The mixture was maintained under an atmosphere of nitrogen, and cooled in an ice bath, and to it were added 136 g. (0.49 mol) of N-benzoyl-5-keto-1,2,2a,3,4,5-hexahydrobenz[cd]indole. To the mixture while being cooled in the ice bath 106 g. (0.86 mol) of ethyl chloroacetate were added dropwise with stirring over a period of ten minutes. The cold solution was stirred for fifteen minutes, was warmed to room temperature and stirred for fifteen minutes, and finally was heated and refluxed for fifteen minutes. The mixture was cooled rapidly and treated with a few hundred grams of ice. The aqueous layer was separated, and the organic layer was washed successively with 1 l. of water, 1 l. of 1.5 N sulfuric acid, 1 l. of 0.7 N sulfuric acid, 1 l. of water and 1 l. of saturated sodium bicarbonate solution. The solution was dried over anhydrous magnesium sulfate, and the solvents were evaporated in vacuo. The syrupy glycidic ester remaining was dissolved in 1200 ml. of absolute ethanol, and to the solution were added slowly with shaking 65 ml. of 12.5 N sodium hydroxide solution. The mixture was allowed to stand for twenty minutes after which it was heated rapidly to 70–75° and held there for five minutes, and then cooled for about one hour. The sodium β-5-(N-benzoyl-1,2,2a,3,4,5-hexahydrobenz[cd]indolyl) glycidate which separated was filtered off, washed with methanol and ether, and dried. The yield was 124 g., 71 percent of theory. The salt melted with decomposition at about 220–223° C. A sample prepared for analysis by recrystallization from a mixture of methanol and ether gave the following analysis:

*Analysis.*—Calculated for $C_{20}H_{16}NO_4Na$: N, 3.92; Na, 6.44. Found: N, 3.85; Na, 6.65.

5 g. (0.014 mol) of sodium β-5-(N-benzoyl-1,2,2a,3,4,-5-hexahydrobenz[cd]indolyl) glycidate was mixed with 100 ml. of dimethylformamide. To the mixture were added 4.5 g. (0.014 mol) of pyridine hydrobromide perbromide. The mixture was warmed to 60° and was then allowed to stand at room temperature for three and one-half hours. To it was added a previously prepared solution of 4.2 g. of semicarbazide hydrochloride and 3.6 g. (0.042 mol) of anhydrous sodium acetate in 35 ml. of dimethyl formamide, and the mixture was heated on a steam bath for one hour. The dimethylformamide was evaporated in vacuo, the dark syrupy residue was treated with water, and the amorphous product which separated was filtered, and washed well with water. The precipitate was dissolved in a minimum of hot glacial acetic acid, the solution was treated with decolorizing carbon, and diluted with two volumes of methanol. After chilling to about 5° C. for a few hours a crystalline precipitate of the semicarbazone of N-benzoyl-5-formyl-1,2,2a,3-tetrahydrobenz[cd]indole separated. The precipitate was filtered off and washed with small amounts of methanol and ether. The yield was 2.95 g., 61 percent of theory. It melted with decomposition at about 232–233° C.

*Analysis.*—Calculated for $C_{20}H_{18}N_4O_2$: C, 69.35; H, 5.24; N, 16.18. Found: C, 69.15; H, 5.24; N, 16.20.

The use of acetic acid as a solvent in the above reaction in place of dimethyl formamide yields the same product in somewhat smaller yield.

A solution of 3 g. of N-benzoyl-5-formyl-1,2,2a,3-tetrahydrobenz[cd]indole semicarbazone in 60 cc. of ethyl cellosolve was refluxed with 3.0 g. of 5 percent palladium on carbon for about two hours. The catalyst was removed by filtration, and the solvent was removed from the filtrate by evaporation in vacuo. The residue, consisting of N-benzoyl-5-formylbenz[cd]indoline semicarbazone, was washed with a small quantity of methanol, and the methanol washings were removed by filtration. N - benzoyl - 5 - formylbenz[cd]indoline semicarbazone melted at about 230–232° C.

*Analysis.*—Calculated for $C_{20}H_{16}O_2N_4$: C, 69.80; H, 4.66; N, 16.26. Found: C, 69.28; H, 5.43; N, 16.12.

Ultraviolet spectrographic analysis yielded maxima at 240 and 357 mμ.

Example 2

22.9 g. of the semicarbazone of N-benzoyl-5-formyl-1,2,2a,3-tetrahydrobenz[cd]indole prepared as set forth in Example 1 were mixed with 160 g. of redistilled pyruvic acid, 230 ml. of chloroform and 10 ml. of water. The solution was shaken until homogeneous and allowed to stand for three hours. It was diluted with 200 ml. of chloroform and washed with three 300 ml. portions of water and with two 300 ml. portions of saturated sodium bicarbonate solution. The chloroform solution was dried over anhydrous magnesium sulfate, treated with decolorizing carbon, and concentrated to dryness in vacuo. The crystalline residue of N-benzoyl-5-formyl-1,2,2a,3-tetrahydrobenz[cd]indole was digested with 100 ml. of hot ethanol, cooled, filtered, and washed with methanol and ether. The yield was 16.1 g., 85 percent of theory. It melted at about 171–174° C. After recrystallization of a sample from ethanol, it melted at about 177–178° C.

*Analysis.*—Calculated for $C_{19}H_{15}NO_2$: C, 78.87; H, 5.23; N, 4.84. Found: C, 78.29; H, 5.73; N, 4.44.

A solution of 2 g. of N-benzoyl-5-formyl-1,2,2a,3-tetrahydrobenz[cd]indole in 30 cc. of dry toluene was refluxed with 3.0 g. of 5 percent palladium on carbon for about two hours. The catalyst was removed by filtration and extracted twice with hot chloroform. The filtrate and washings were combined and evaporated to dryness in vacuo. The residue, consisting of N-benzoyl-5-formylbenz[cd]indoline, was crystallized from benzene-petroleum ether and recrystallized from methanol.

N-benzoyl-5-formylbenz[cd]indoline thus prepared melted at about 165–168° C.

*Analysis.*—Calculated for $C_{19}H_{13}NO_2$: C, 79.40; H, 4.53; N, 4.88. Found: C, 79.10; H, 4.99; N, 5.18.

Alternatively, N-benzoyl-5-formylbenz[cd]indoline can be prepared from the N-benzoyl-5-formylbenz[cd]indoline semicarbazone of Example 1 by reaction with pyruvic acid according to the process set forth hereinabove.

Example 3

N-acetylindoline-3-propionic acid was prepared by the reduction and acetylation of indole-3-propionic acid.

A mixture of 23.3 g. (0.1 mol) of N-acetylindoline-3-propionic acid and 50 ml. of pure thionyl chloride was allowed to stand for one-half hour at room temperature and thereafter was warmed for about twenty minutes on a steam bath. The excess of thionyl chloride was removed by evaporation in vacuo. The residue was dissolved in 50 ml. of dry nitrobenzene, and the nitrobenzene solution was added in a thin stream to a vigorously stirred suspension of 60 g. of anhydrous aluminum chloride in 150 ml. of nitrobenzene, the reaction mixture being cooled externally to maintain the reaction temperature at about 10° to 20° C. The mixture was then stirred and heated at 50° C. for about three hours and allowed to stand at room temperature for a few hours. The reaction mixture was cooled to 20° C. and decomposed by the slow addition of a mixture of 100 g. of crushed ice, 100 ml. of concentrated hydrochloric acid, and 200 ml. of water. The lower nitrobenzene layer was separated and washed with three 150 ml. portions of 2N sodium hydroxide solution, and then with water. The washed nitrobenzene layer was separated and steam distilled to remove the nitrobenzene. The aqueous residue which contained a precipitate of N-acetyl-5-keto-1,2,2a,3,4,5-hexahydrobenz[cd]indole was filtered, and the precipitate was washed with water and dried. The dry material melted at about 174.5–176.5° C.

N-acetyl-5-keto-1,2,2a,3,4,5-hexahydrobenz[cd]indole was treated according to the procedure set forth in Example 1 with potassium *t*-butoxide and ethyl chloroacetate to form sodium β-5-(N-acetyl-1,2,2a,3,4,5-hexahydrobenz[cd]indolyl) glycidate, which was further reacted with pyridine hydrobromide perbromide and semicarbazide hydrochloride to form the semicarbazone of N-acetyl-5-formyl-1,2,2a,3-tetrahydrobenz[cd]indole melting at about 240–245° C. with decomposition.

A solution of 3 g. of N-acetyl-5-formyl-1,2,2a,3-tetrahydrobenz[cd]indole semicarbazone in 50 cc. of ethyl Cellusolve was refluxed with 3.0 g. of 5 percent palladium on carbon for about two hours. The catalyst was filtered off and washed with hot Cellosolve. The combined filtrate and washings were evaporated to dryness in vacuo and the residue, consisting of N-acetyl-5-formylbenz[cd]indoline semicarbazone, was washed with cold methanol and dried. N-acetyl-5-formylbenz[cd]indoline semicarbazone melted at about 245–248° C.

Other N-acyl derivatives of 5-formyl-1,2,2a,3-tetrahydrobenz[cd]indoline semicarbazone are prepared in a manner analogous to the procedure of this example by acylating indole-3-propionic acid with the appropriate acylating agent, such as for example butyric anhydride, toluic acid chloride, cyclopentyl carboxylic acid chloride, propionyl chloride and the like, and subjecting the product to the procedures described hereinabove.

Example 4

A mixture of 5.55 g. of N-benzoyl-5-keto-1,2,2a,3,4,5-hexahydrobenz[cd]indole, prepared according to the procedure of Example 1, 10 g. of 20 mesh activated zinc, 100 cc. of dry benzene and 5 cc. of methylbromoacetate was refluxed with stirring, and a crystal of iodine was introduced to initiate reaction. Stirring was continued under reflux for four hours during which time 25 g. of zinc were added in 5 g. portions at about forty-minute intervals. The reaction mixture was cooled and diluted with 100 cc. of benzene, and ice and 15 cc. of acetic acid were added. The benzene layer was separated and washed with successive portions of water, dilute acetic acid, and two portions of dilute ammonium hydroxide followed by a final washing with water. The solution was dried over anhydrous magnesium sulfate, and the benzene removed in vacuo. The residue, consisting of N-benzoyl-5-hydroxy-5-carbomethoxymethyl-1,2,2a,3,-4,5-hexahydrobenz[cd]indole formed in the reaction, was recrystallized from benzene and melted at 113–115° C.

*Analysis.*—Calculated for $C_{21}H_{21}NO_4$: N, 3.99. Found: N, 3.25.

The product derived from the foregoing procedure was warmed with 70 cc. of 98 percent of formic acid on a steam bath for about fifteen minutes. The formic acid was removed in vacuo, and the residue was taken up in benzene, washed with dilute sodium bicarbonate solution, dried over magnesium sulfate and the benzene evaporated. The N-benzoyl-5-carbomethoxymethyl-1,2,2a,3-tetrahydrobenz[cd]indole thus obtained was recrystallized from methanol and melted at about 107–110 degrees C.

*Analysis.*—Calculated for $C_{21}H_{19}NO_3$: C, 75.65; H, 5.74; N, 4.20. Found: C, 75.12; H, 5.74; N, 4.26.

N-benzoyl-5-carbomethoxy-1,2,2a,3-tetrahydrobenz[cd]indole was hydrolyzed with dilute alcoholic sodium hydroxide followed by acidification to yield N-benzoyl-5-carboxymethyl-1,2,2a,3-tetrahydrobenz[cd]indole, which melted at about 238–239° C. with decomposition.

*Analysis.*—Calculated for $C_{20}H_{17}NO_3$: C, 75.22; H, 5.37; N, 4.39. Found: C, 74.69; H, 5.69; N, 4.43.

A mixture of 2 g. of N-benzoyl-5-carboxymethyl-1,2,2a,3-tetrahydrobenz[cd]indole and 3 g. of 5 percent palladium on carbon in 30 cc. of xylene was refluxed for two hours. The catalyst was removed by filtration and washed with hot benzene, ethyl acetate, and chloroform. The combined filtrates were evaporated to dryness, and the oily residue was crystallized from acetic acid-methanol.

N-benzoyl-5-carboxymethylbenz[cd]indoline melted at about 227–230° C. with decomposition.

Example 5

A mixture of 0.01 mol of N-benzoyl-5-formyl-1,2,2a,3-tetrahydrobenz[cd]indole prepared according to the process of example 2, 1.0 g. of hydroxylamine hydrochloride, 15 cc. of pyridine and 15 cc. of ethanol was refluxed for two hours. The solvents were thereafter removed in vacuo and the residue, comprising the oxime of N - benzoyl - 5 - formyl - 1,2,2a,3 - tetrahydrobenz[cd]indole, was triturated with water, filtered and recrystallized from alcohol, whereupon it melted at about 172–173° C.

*Analysis.*—Calculated for $C_{19}H_{16}N_2O_2$: C, 74.98; H, 5.30; N, 9.21. Found: C, 75.21; H, 5.36; N, 9.05.

1 g. of N-benzoyl-5-formyl-1,2,2a,3-tetrahydrobenz[cd]-indole oxime was mixed with 1 g. of 5 percent palladium on carbon and 20 cc. of ethyl Cellosolve. The mixture was refluxed for two hours. The catalyst was then removed by filtration, and the solvent distilled off in vacuo. The residue, consisting of N-benzoyl-5-cyano-benz[cd]indoline, melted at about 189–190° C.

*Analysis.*—Calculated for $C_{19}H_{12}N_2O$: C, 80.26; H, 4.26; N, 9.86. Found: C, 80.06; H, 4.55; N, 9.68.

Ultraviolet absorption spectrum studies showed maxima at 252 and 347 m$\mu$.

Example 6

A mixture of 2 g. of N-benzoyl-5-carbomethoxymethyl-1,2,2a,3-tetrahydrobenz[cd]indole (prepared according to the procedure of Example 4), 3 g. of 5 percent palladium on carbon and 30 cc. of xylene was refluxed for twelve hours. The catalyst was then filtered off and washed with successive portions of hot benzene, ethyl acetate and chloroform. The combined filtrate and washings were evaporated to dryness and the oily residue was crystallized from methanol. After recrystallization from methanol the N - benzoyl - 5 - carbomethoxymethylbenz[cd]-indoline thus obtained melted at 117–119° C.

*Analysis.*—Calculated for $C_{21}H_{17}NO_3$: C, 76.2; H, 5.14; N, 4.23. Found: C, 75.54; H, 5.33; N, 4.07.

The ultraviolet absorption spectrum was found to have maxima at 322 and 328 m$\mu$.

Example 7

The procedure of Example 4 was followed, except that ethyl bromoacetate was employed to yield N-benzoyl - 5 - hydroxy - 5 - carbethoxymethyl - 1,2,2a,3,4,5-hexahydrobenz[cd]indole, which melted at 142–143° C.

*Analysis.*—Calculated for $C_{22}H_{23}NO_4$: C, 72.31; H, 6.34; N, 3.83. Found: C, 72.15; H, 6.64; N, 3.88.

Upon dehydration with formic acid as described in Example 4, N-benzoyl-5-carbethoxymethyl-1,2,2a,3-tetrahydrobenz[cd]indole melting at about 116–117.5° C. was obtained.

*Analysis.*—Calculated for $C_{22}H_{21}NO_3$: C, 76.05; H, 6.09; N, 4.03. Found: C, 75.77; H, 6.36; N, 4.03.

A mixture of 2 g. of N-benzoyl-5-carbethoxymethyl-1,2,2a,3-tetrahydrobenz[cd]indole, 3 g. of 5 percent palladium on carbon and 20 cc. of xylene was refluxed for about twelve hours. The catalyst was filtered off and washed with successive portions of hot benzene, ethyl acetate and chloroform. The combined filtrate and washings were evaporated to dryness, leaving a residue consisting of N - benzoyl - 5 - carbethoxymethylbenz[cd]indoline.

Example 8

6.7 g. of potassium were dissolved in 300 ml. of dry tertiary butyl alcohol, and the excess solvent was evaporated in vacuo. The potassium tertiary butylate was dissolved in 300 ml. of dry benzene, and to the solution were added 27.7 g. of N-benzoyl-5-keto-1,2,2a,3,4,5-hexahydrobenz[cd]indole. The mixture was cooled in ice under nitrogen, and to it were added dropwise with stirring over a period of about five minutes 15.4 g. of $\alpha$-chloropropionitrile. The cooled mixture was stirred for thirty minutes, was refluxed for one hour, and was cooled and diluted with ice water. The benzene layer which separated was recovered and washed sequentially with water, dilute hydrochloric acid, water, and saturated sodium bicarbonate solution, and was dried over anhydrous magnesium sulfate. The benzene was distilled in vacuo, and the syrupy residue of $\alpha$-methyl-$\beta$-5-(N-benzoyl-1,2,2a,3,4,5-hexahydrobenz[cd]indolyl) glycidonitrile was crystallized from a mixture of nitromethane and methanol. The crystalline product was filtered off, washed with methanol and dried. The yield was 10.6 g., 32 percent of theory. It melted at about 147–150° C. A sample recrystallized from methanol-nitromethane mixture melted at about 156–158° C.

*Analysis.*—Calculated for $C_{22}H_{18}N_2O_2$: C, 76.34; H, 5.49; N, 8.48. Found: C, 76.19; H, 5.63; N, 8.41.

A solution of 65.3 g. of $\alpha$-methyl-$\beta$-5-(N-benzoyl-1,2,-2a,3,4,5-hexahydrobenz[cd]indolyl) glycidonitrile in 750 ml. of benzene and 750 ml. of absolute ether was cooled, and 210 g. of dry hydrogen chloride were passed into it with stirring and continued cooling. The solution was allowed to stand for twenty-four hours after which the solvents were removed completely in vacuo at 100° C., leaving a residue of N-benzoyl-5-acetyl-5-chloro-1,2,2a,-3,4,5-hexahydrobenz[cd]indolecyanohydrin. 750 ml. of collidine were added to the crude cyanohydrin, and the solution was refluxed for one hour. The collidine was removed in vacuo and 700 ml. of chloroform were added to the residue. The solution was washed successively with 1 l. of water, with two 1 l. portions of N-hydrochloric acid, with 1 l. of water and with a saturated sodium bicarbonate solution. The chloroform solution was dried over anhydrous magnesium sulfate, and the chloroform was evaporated in vacuo. The crystalline product consisting of N-benzoyl-5-acetyl-1,2,2a,3-tetrahydrobenz[cd]indole was taken up in petroleum ether and filtered. The yield was 43.5 g., 73 percent of theory. It melted at about 174–175° C. A sample melting at about 186–188° C. was obtained by recrystallizing the material from benzene.

*Analysis.*—Calculated for $C_{20}H_{17}NO_2$: C, 79.18; H, 5.65; N, 4.62. Found: C, 78.46; H, 5.85; N, 4.96.

Other 5-acyl-1,2,2a,3-tetrahydrobenz[cd]indoles are obtained by employing an $\alpha$-chloroalkyl cyanide other than $\alpha$-chloropropionitrile as described above. Thus for example, $\alpha$-chloro derivatives of butyronitrile, capronitrile and the like can be employed to provide 5-acyl derivatives which contain a longer alkyl chain.

As was the case with 5-formyl-1,2,2a,3-tetrahydrobenz[cd]indole, other N-acyl derivatives can be employed instead of the N-benzoyl derivative.

A mixture of 2 g. of N-benzoyl-5-acetyl-1,2,2a,3-tetrahydrobenz[cd]indole, 3 g. of 5 percent palladium on carbon and 30 cc. of *p*-cymene was refluxed for about two hours. The catalyst was removed by filtration and washed with hot benzene; the combined filtrate and washings were concentrated to a small volume in vacuo. A crystalline product separated and was filtered off; upon recrystallization from benzene in methanol, N-benzoyl-5-acetylbenz[cd]indoline, melting at about 156–158° C., was obtained.

*Analysis.*—Calculated for $C_{20}H_{15}NO_2$: C, 79.8; H, 4.98; N, 4.66. Found: C, 79.00; H, 4.55; N, 5.28.

I claim:

1. A compound represented by the formula

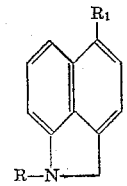

wherein R represents a member of the group consisting of lower alkanoyl and monocarbocyclic aroyl radicals, and $R_1$ represents a member of the group consisting of formyl, cyano, alkanoyl, formylsemicarbazone, lower carboxyalkyl and lower carbalkoxyalkyl radicals.

2. A compound represented by the formula

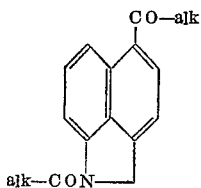

wherein alk represents a lower alkyl radical.

3. A compound represented by the formula

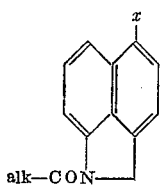

wherein alk represents a lower alkyl radical and $x$ represents a lower carboxyalkyl radical.

4. A compound represented by the formula

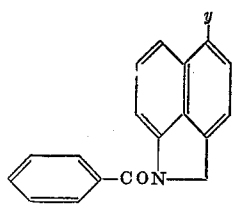

wherein $y$ represents a lower carbalkoxyalkyl radical.

5. N-benzoyl-5-formylbenz[cd]indoline.
6. N-benzoyl-5-cyanobenz[cd]indoline.
7. N-benzoyl-5-acetylbenz[cd]indoline.
8. N-benzoyl-5-carboxymethylbenz[cd]indoline.
9. N-benzoyl-5-carbomethoxymethylbenz[cd]indoline.

References Cited in the file of this patent

UNITED STATES PATENTS

| | | |
|---|---|---|
| 2,621,186 | Grob | Dec. 9, 1952 |
| 2,663,714 | Kornfeld | Dec. 22, 1953 |

OTHER REFERENCES

Helv. Chim. Acta., vol. 33, pp. 1796–1800.